United States Patent Office 2,815,340
Patented Dec. 3, 1957

2,815,340

REACTION PRODUCTS OF FATTY AMINES AND REDUCING DISACCHARIDES

John G. Erickson, Minneapolis, Minn., assignor to General Mills, Inc., a corporation of Delaware No Drawing. Application August 3, 1953,
Serial No. 372,141

6 Claims. (Cl. 260—211)

The present invention relates to certain reaction products of primary long chain fatty amines with reducing disaccharides. It also relates to a method of producing these materials.

The products of the present invention possess unusual properties and are relatively inexpensive to prepare. The compounds themselves are useful as waterproofing agents, particularly for textiles and also have textile-softening properties. They are, however, also useful as intermediates for the preparation of a wide variety of compounds, including detergents, wetting agents, and waterproofing agents. The particular use for a particular compound will depend upon the nature of the sugar employed, the amine, and the number of amine groups introduced into the reaction product.

It is, therefore, an object of the present invention to provide novel compounds resulting from the reaction of primary long chain fatty amines with reducing disaccharides and which contain at least two primary long chain fatty amine groups in the disaccharide molecule.

It is another object of the present invention to provide a method of producing these compounds.

The reaction can perhaps best be described by reference to a specific illustration. In the following reaction, maltose is reacted with the primary fatty amine $RNH_2$ in which R is a long chain aliphatic hydrocarbon group containing from 8–22 carbon atoms. The first product of the reaction is

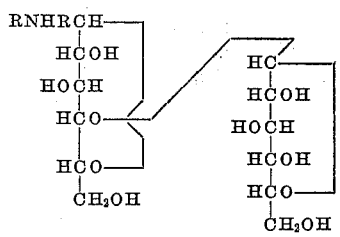

This compound may then react with more amine, and the result of the second stage of the reaction is the following compound:

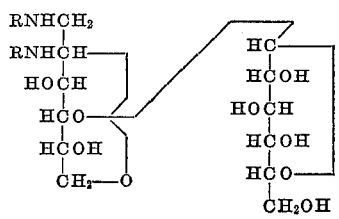

The product of the second stage of the reaction may be isomeric with the above compound, differing only in the nature of the lefthand ring. By reacting with further amine, the following product is obtained:

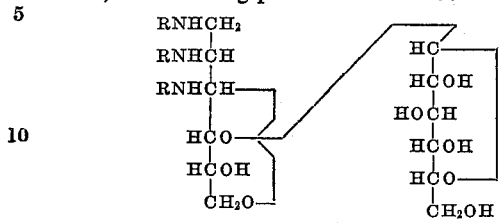

or a very similar product, differing in the left-hand ring, which may be replaced by an open chain structure and a C=N double bond. In the case of maltose, the reaction stops at this point becouse the next carbon atom has no free hydroxyl group. In the case of some disaccharides such as gentiobiose and melibiose, up to five amine residues may be introduced. This is illustrated as follows:

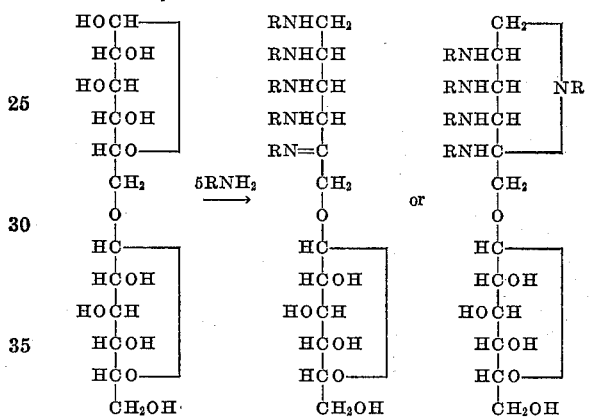

The structure of the product in the example above may be as shown, or it may differ in the position of the C=N double bond. This may also be replaced by any of several rings, one of which is shown.

Finally, the reaction encounters and is stopped by a hydroxyl group which is blocked by attachment to the other monosaccharide unit. It may be stated, therefore, that the products of the reaction contain at least 2 fatty amino groups, and the number of such groups may be increased up to the number of carbon atoms in that portion of the monosaccharide group which contains the reducing carbonyl group up to but not including the carbon atom which is joined to the other monosaccharide unit. Thus, in the case of maltose and lactose, it is possible to introduce up to 3 fatty amino groups. In the case of gentiobiose and melibiose, up to 5 amino residues may be introduced. With other reducing disaccharides the number of the fatty amino groups may be varied in accordance with the above general statement.

The primary fatty amines which may be employed are those which contain from 8–22 carbon atoms. These generally are derived from fatty acids by the formation of the nitrile and the reduction of the nitrile. Accordingly, the fatty amines may be those derived from a single, isolated fatty acid, from the mixed fatty acids of a fat or oil, or from any selected fraction thereof. The amines may be either saturated or unsaturated or mixtures of saturated and unsaturated amines. For waterproofing properties, it is preferred that the longer chain fatty amines be employed, preferably those containing from 16–22 carbon atoms. Where the compounds are intended for use as intermediates in the preparation of detergents and surface-active agents, it is preferred to employ the shorter chain amines, those containing from 10–14 carbon atoms, and especially dodecylamine.

The reaction conditions employed depend upon the number of amine groups to be introduced. It is generally preferred to employ an excess of the amine over that equivalent to the number of amine groups which it is desired to introduce. For the introduction of two amine residues, moderate heating for 2–3 hours at 50–60° C. will suffice. For the introduction of three amine residues, longer heating or higher temperatures are necessary, for example, 3–4 hours at 60–70° C. For the introduction of five amine groups into such sugars as gentiobiose and melibiose, it is necessary to employ even higher temperatures or longer heating periods, for example, 4–5 hours at 80° C.

The reaction is preferably carried out in the presence of a solvent. Alcohols, especially the water-miscible lower aliphatic alcohols, such as methanol, ethanol, isopropanol, and tertiary butanol are suitable. The reaction products become insoluble upon cooling the reaction mixture and may be removed by filtering. Any excess amine remains soluble and is thus separated from the reaction product. If desired, the product can be further purified by recrystallization from one of the lower alcohols or from ethyl acetate, or it may be washed free of excess amine.

*Example 1*

A mixture of 18.5 parts of dodecylamine, 7.2 parts of maltose and 40 parts of ethyl alcohol was heated at 75–80° C. for 6 hours. It was then evaporated to dryness at 25° C. The residue, when washed with a low-boiling hydrocarbon, yielded the reaction product of two moles of dodecylamine with one mole of maltose. It is a light-colored solid, melting with decomposition at 210–220° C. Calculated for $C_{36}H_{73}N_2O_9$: C, 63.77; H, 10.85; N, 4.13. Found: C, 61.33; H, 10.19; N, 4.42. This was a mixture of the reaction products of one mole of maltose with one and two moles of dodecylamine.

*Example 2*

A mixture of 26.9 parts of octadecylamine, 36 parts of lactose, 200 parts of ethyl alcohol and 150 parts of water was heated at 80° C. for 20 minutes. It was allowed to cool, then heated to 70° C. and immediately allowed to cool gain. It was filtered, giving a product which was a mixture of the reaction products of one and two moles of octadecylamine with one mole of lactose.

Fifteen parts of this mixture of products was heated with 40 parts of octadecylamine in 80 parts of ethyl alcohol for 2 hours at 70–75° C. It was cooled and filtered. The product was recrystallized from ethyl alcohol, giving a solid, melting at 66–107° C. Analysis showed it to be a mixture of the reaction products of two and three moles of octadecylamine with one mole of lactose. The mixture can be resolved by crystallization from benzene, in which case the product containing two amine groups crystallizes, leaving the compound containing three amino groups dissolved in the solvent from which it can be recovered by evaporation of the solvent.

Numerous other variations of the invention are possible by substituting other amines and other reducing disaccharides for those specifically described in the examples. The reaction proceeds in the same manner and the products will vary depending upon the number of fatty amine groups introduced, and upon the nature of the fatty amine group.

I claim as my invention:

1. Reaction products of primary fatty amines containing from 12–18 carbon atoms and reducing disaccharides, the reaction product containing a number of fatty amine groups from two to the number of carbon atoms in that portion of the monosaccharide containing the reducing carbonyl group up to the carbon atom which connects to the other monosaccharide group.

2. A reaction product of a primary fatty amine containing from 12–18 carbon atoms with maltose, the reaction product containing from 2–3 fatty amine groups.

3. A reaction product of a primary fatty amine containing from 8–22 carbon atoms with lactose, the reaction product containing from 2–3 fatty amine groups.

4. The reaction product of dodecylamine and maltose, the reaction product containing 2 dodecylamine groups.

5. The reaction product of octadecylamine and lactose, the reaction product containing from 2–3 octadecylamino groups.

6. Process of producing reaction products of reducing disaccharides and fatty primary amines containing from 12–18 carbon atoms which comprises reacting the disaccharide with a fatty primary amine containing from 8–22 carbon atoms at a temperature of from 50–80° C. for a time period of from 2–5 hours, the fatty amine being employed in a molar ratio within the range of from 2 to the number of carbon atoms in that portion of the monosaccharide unit containing the reducing carbonyl group up to the carbon atom which connects that monosaccharide unit to the other monosaccharide unit.

References Cited in the file of this patent

UNITED STATES PATENTS 2,181,929   Werntz _____ Dec. 5, 1939

OTHER REFERENCES

Votocek: "Collection Trav. Chim. T. Checoslvaquie," vol. 6 (1934), pp. 77 to 96. (Copy in U. S. Bureau of Geological Survey Library.)

Mitts et al.: J. A. C. S. 66, 483 (1944).